ately mounted concentric rings, each of which contains a plurality of visual images correlated with the sound tracks, are adjustable with the rotatable concentric recording surfaces. In use, the visual images are aligned in a particular series or sequence and the device audibly reproduces a message or "story" descriptive of or correlated to the series of visual images.

United States Patent [19]
Licitis

[11] 3,871,112
[45] Mar. 18, 1975

[54] COORDINATED VISUAL AND AUDIO REPRODUCING APPARATUS

[75] Inventor: Gunars Licitis, Lombard, Ill.

[73] Assignee: Marvin Glass & Associates, Chicago, Ill.

[22] Filed: Oct. 1, 1973

[21] Appl. No.: 402,093

Related U.S. Application Data

[63] Continuation-in-part of Ser. No. 282,377, Aug. 21, 1972, Pat. No. 3,801,110.

[52] U.S. Cl............................... 35/8 A, 46/175 AR
[51] Int. Cl. ............................................ G09b 1/00
[58] Field of Search.......... 46/175 AR, 232; 35/8 R, 35/8 A; 174/1 A

[56] References Cited
UNITED STATES PATENTS

| | | | |
|---|---|---|---|
| 2,680,150 | 6/1954 | Weld................................ | 272/42 R |
| 3,325,916 | 6/1967 | Greenlee.......................... | 272/42 R |
| 3,590,525 | 7/1971 | Tomaro............................ | 46/232 |
| 3,636,655 | 1/1972 | Porter et al. .................... | 46/175 AR |
| 3,637,972 | 1/1972 | Hataya et al. ............. | 179/100.2 MD |
| 3,711,964 | 1/1973 | Folson et al. ................... | 35/8 A |

Primary Examiner—Louis G. Mancene
Assistant Examiner—Robert F. Cutting
Attorney, Agent, or Firm—Coffee & Sweeney

[57] ABSTRACT

A story-telling toy device providing for selection of a number of recorded message segments to be played in a plurality of different combinations, each recorded message segment being attributable to a particular visual image in a series of visual images. The recorded messages and visual images may be arranged and locked in any combination to play a particular series. The device includes several rotatably mounted concentric recording surfaces, each of which contains a plurality of recorded messages on spirally interleaved sound tracks. An identical number of rotatably mounted concentric rings, each of which contains a plurality of visual images correlated with the sound tracks, are adjustable with the rotatable concentric recording surfaces. In use, the visual images are aligned in a particular series or sequence and the device audibly reproduces a message or "story" descriptive of or correlated to the series of visual images.

18 Claims, 15 Drawing Figures

PATENTED MAR 18 1975 3,871,112

COORDINATED VISUAL AND AUDIO REPRODUCING APPARATUS

This is a continuation-in-part of my copending application Ser. No. 282,377, entitled "Sound Record," filed Aug. 21, 1972, U.S. Pat. No. 3,801,110.

BACKGROUND OF THE INVENTION

This invention relates to phonographs and in particular to toy phonographs wherein a message is attributable to a series of visual images or photographs. Phonograph devices have previously provided for the sequential playing of a series of message segments recorded on concentric discs wherein the total of said message segments comprises the complete message, as disclosed in U.S. Pat. No. 2,680,150. Other devices have provided for the playing of one of a plurality of audio messages attributable to one particular visual image of a plurality of visual images. The present invention is particularly directed to a toy phonograph device which, unlike the prior art, provides for playing of a selectively changeable sequence of message segments attributable to a particular sequence of visual images, wherein the realignment of the visual images, either by changing one or all of the visual images produces a new total message descriptive of the new series of visual images.

SUMMARY OF THE INVENTION

In the exemplary embodiment of the invention, the phonograph device includes a sound record comprised of a plurality of concentric annular disc portions, each of which contains a plurality of messages provided by a spirally inter-leaved sound track. A visual image surface is provided by an identical number of concentric annular disc portions each of which contains a plurality of visual images thereabout. The invention includes a multiple coupling arrangement for alignment of the sound tracks and the visual images. Drive means is provided for rotating the sound record, including a battery powered motor and sound reproducing means engageable with said record for audibly reproducing the messages thereon. A shifting means is provided for engagement of the said couplings for indexing, and a pushbutton starting means for starting the device. The shifting means and starter button are interlocked so as to prohibit simultaneous operation.

DESCRIPTION OF THE PREFERRED EMBODIMENT

Figures 1, 13, 14, 15:
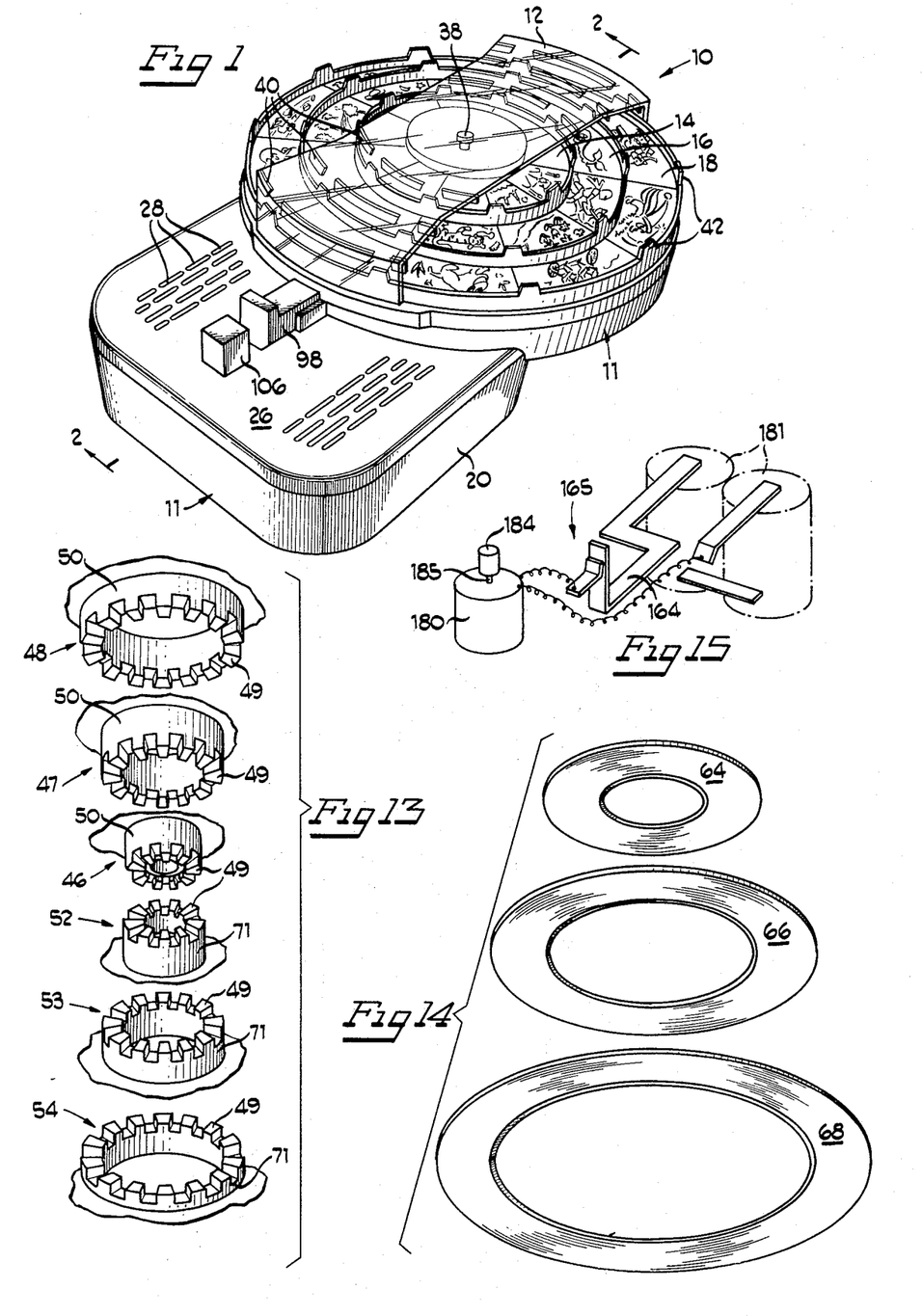
FIG. 1 is a perspective view of a phonograph device embodying the concepts of the present invention.
FIG. 13 is a fragmented exploded view of the indexing coupling mechanism.
FIG. 14 is an exploded view of the sound record disc portions.
FIG. 15 is a somewhat schematic illustration of the electrical system and wiring.
Figure 2:
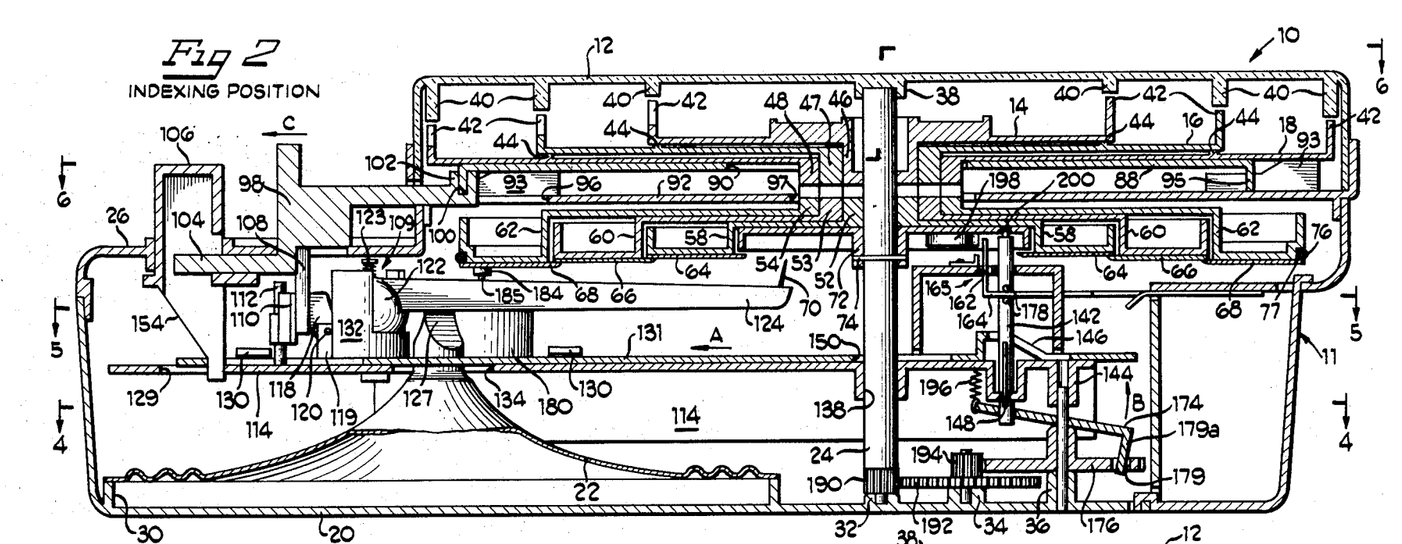
FIG. 2 is a vertical section, on an enlarged scale, taken generally along the line 2—2 of FIG. 1, with various components of the device in their relative indexing positions.

Referring to the drawings in greater detail, and first to FIGS. 1 and 2, the story telling toy device, generally designated 10, embodying the concepts of the present invention comprises a housing, generally designated 11, having a transparent upper cover part 12 partially enclosing three concentric visual image disc portions 14, 16 and 18 and a lower part 20 enclosing a flexible diaphragm 22 and a main support shaft 24.

For convenience, the device will be described as though supported on a horizontal surface such as a table top, in the position generally seen in FIGS. 1 and 2, although the mechanism is capable of operating in any position.

The lower part 20 of the housing is generally rectangular and includes a perforated upper wall portion 26 (FIG. 1) for the escapement of sound from the diaphragm 22 through a plurality of elongated holes 28. The lower part 20 includes an interior raised ridge 30 for mounting the diaphragm 22 and three interior shaft supports or bosses 32, 34 and 36.

Figure 3:
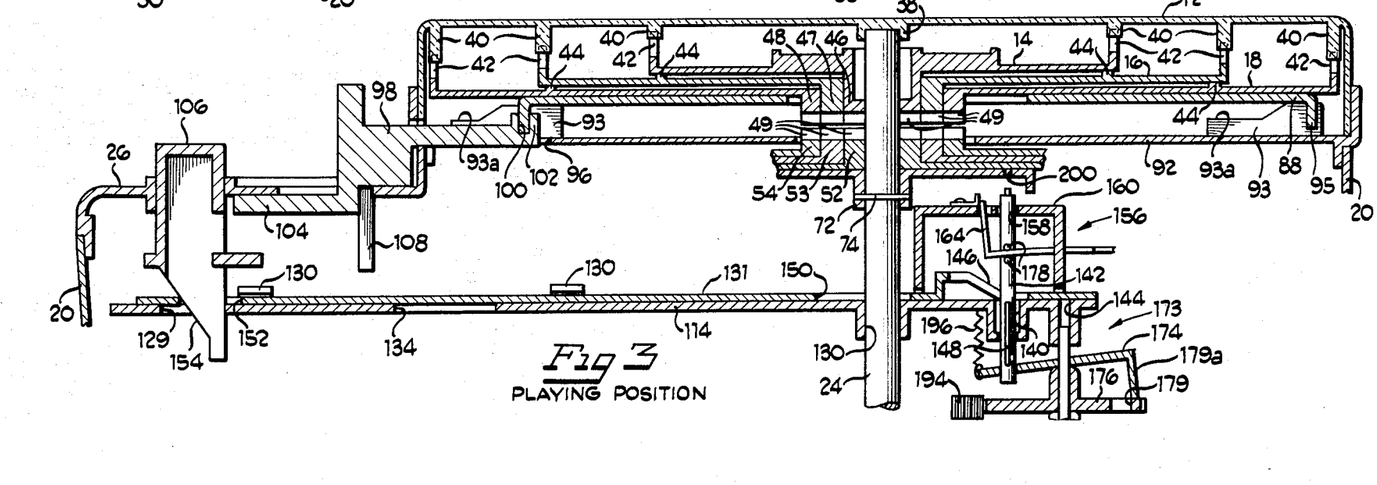
FIG. 3 is a fragmentary vertical section similar to FIG. 2, with the various components of the device in their relative playing positions.

The upper transparent cover part 12 of the housing includes a centrally located shaft support 38 on the underside thereof for positioning on top of the main shaft 24. A plurality of ribs 40 also are provided on the underside of the cover for engagement of a plurality of tabs 42 on the concentric visual image disc portions 14, 16 and 18 to interlock the disc portions during operation of the device in the "playing" position as shown in FIG. 3.

Figures 6, 10:
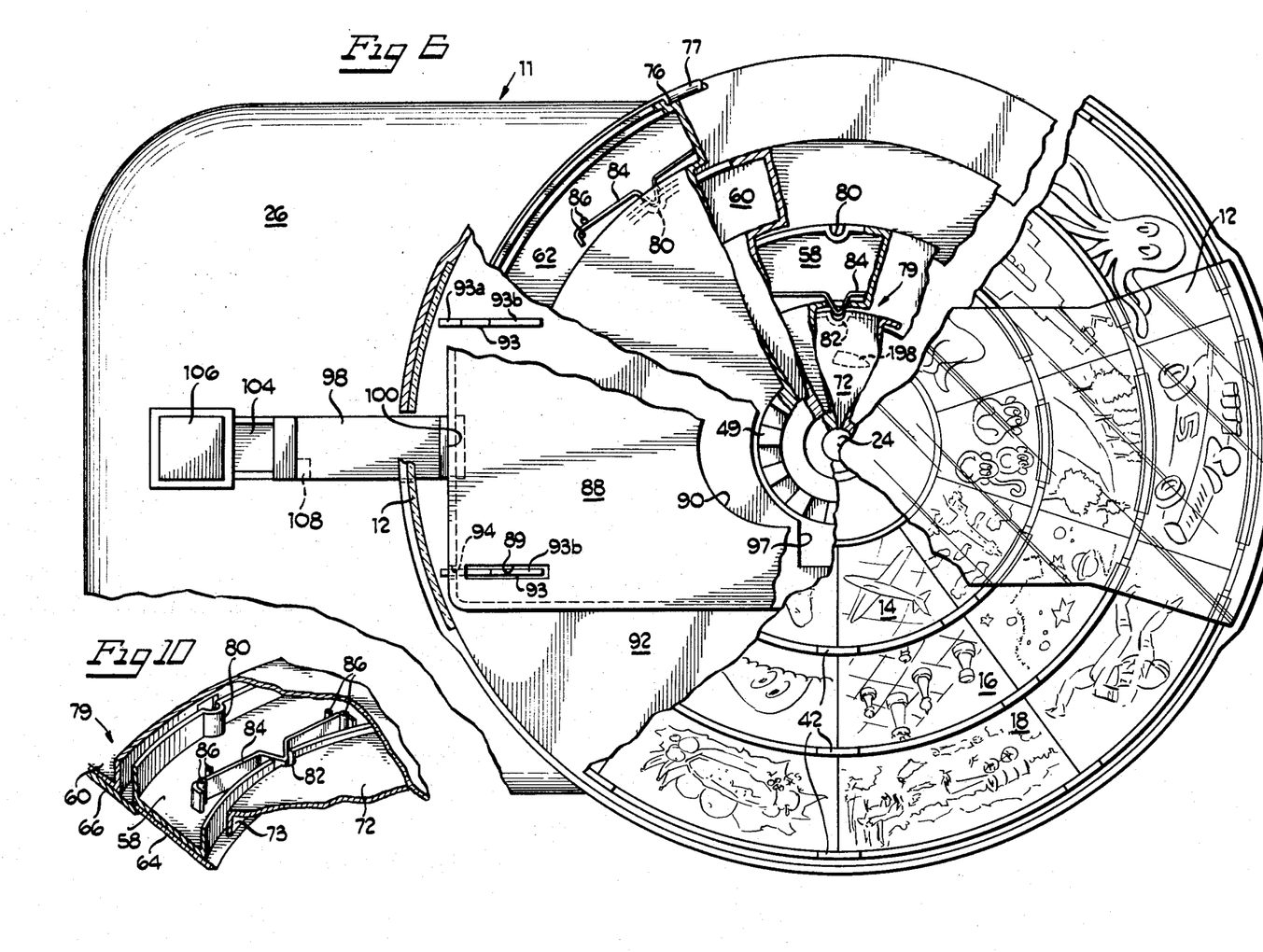
FIG. 6 is a fragmented horizontal section taken generally along line 6—6 of FIG. 2.
FIG. 10 is a broken away perspective view of the record disc locking mechanism.

The concentric visual image disc portions 14, 16 and 18 are generally circular in shape, as best seen in FIGS. 1 and 6, with successively smaller visual image discs resting on raised supporting ridges 44 (FIGS. 2 and 3) of the next larger disc. Integral with each visual image disc portions 14, 16, 18 is a plurality of coupling gears, generally designated 46, 47, 48, respectively (FIG. 13), in the form of cup gears each having teeth 49 disposed along the edge of a cylindrical portion 50. The cylindrical portion 50 of the coupling gears 46, 47 and 48 also provides an inner and outer bearing surface during relative rotation of the visual image disc portions 14, 16, 18 with the inner surface 50 of the smallest coupling gear 46 bearing on the central support shaft 24. A plurality of the tabs 42 are provided on each visual image disc portion 14, 16, 18, such that in the playing position (FIG. 3) the tabs 42 are in engagement with the ribs 40 of the upper cover part 12 of the housing 11, thus preventing rotation of the visual image disc portions 14, 16, 18 in that relative positioning.

In the "indexing" position (FIG. 2), the visual image disc portions 14, 16, 18 are lowered by a shifting mechanism, to be described in greater detail hereinafter, such that the tabs 42 are not in engagement with the ribs 40 of the cover and thus are freely rotatable.

The sound record assembly is composed of three recording disc portions 58, 60 and 62 (FIG. 2) each of which has an integral coupling means or gear, generally designated 52, 53 and 54, respectively. The recording disc portions 58, 60, 62 are generally circular in shape with a stepped section around the perimeter thereof. Each stepped portion supports a recording surface member 64, 66, 68 (FIGS. 1, 2 and 14) which has a chamfered section around its perimeter at the joints between the members to facilitate easy movement of the stylus 70 from one recording member to another. Of course, the recording surface could be formed directly on the disc portions 58, 60 and 62. Each recording surface memmber 64, 66 and 68, with the chamfered sections, overlaps the next smaller recording member providing means for the stylus 70 to trace a combined groove comprised of one groove from each recording member 64, 66, 68. The sound track on each recording surface comprises a plurality of spiral interleaved grooves having outer and inner ends for alignment with the ends of the grooves on the sound track of the adjacent member. Such a sectioned sound record can be seen in greater detail in copending application, Ser. No. 282,377, filed Aug. 21, 1972 entitled Sound Record which is incorporated by reference.

The coupling gears 52, 53, 54 have cylindrical portions 71 which, like cylindrical portions 50 of gears 46, 47 and 48 have teeth 49 and inner and outer bearing surfaces for relative rotation of the recording disc portions 58, 60, 62 with the inner surface of the cylindrical portion of the smallest coupling gear 52 bearing on the central support shaft 24. The recording discs are supported by a flanged, journalled diac 72 (FIGS. 2 and 3), which is secured to the central support shaft 24 by means of a pin 74, or it may be molded as an integral part of the central support shaft 24 of plastic or other suitable material.

The recording disc portion 62 has a peripheral groove 76, suitable for accepting a flexible O-ring 77 to provide friction for the drive means of the apparatus, generally designated 78 (FIG. 8), to be described in greater detail hereinafter.

Referring to FIG. 10, the recording disc portions 58, 60, 62 are rotatable relative to one another but are provided with detent means in the form of a spring locking means, generally designated 79, to provide unitary rotation of recording disc portions 58, 60, 62 during operation. The two inner recording disc portions 58 and 60 are provided with a plurality of detents or notches 80 located at 36° intervals around the periphery of the disc. The central support disc 72 is provided with a plurality of detents or notches 82 in a peripheral flange 73 at 36° intervals. On the side of the record discs opposite the side which supports the recording members 64, 66, 68 there is provided a spring 84 supported on each end by two pins 86 which may be molded as an integral part of the recording disc. The central portion of the spring 84 is V shaped such that the apex of the V points toward the central support shaft 24 and fits into the appropriate notch or detent 80 or 82 on the adjacent member and thereby causes the three recording disc portions 58, 60, 62 and the central support disc 72 to lock together and rotate as a unitary member during operation.

Figure 11:
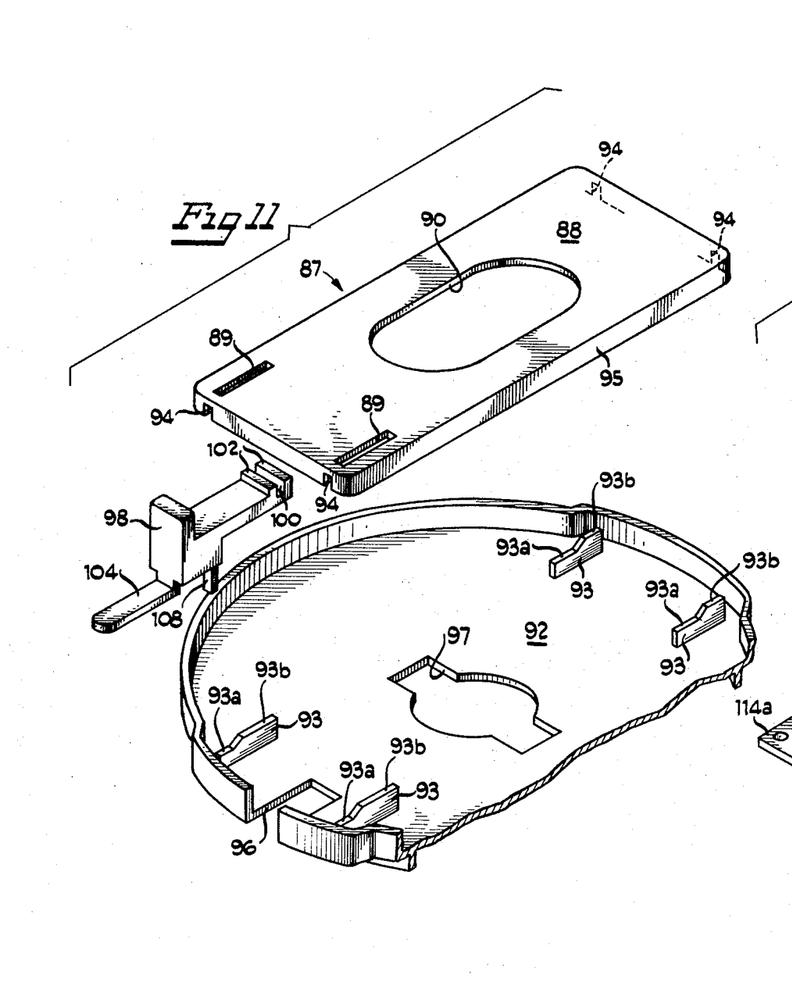
FIG. 11 is a fragmented, exploded view of the clutch components.

A shiftable clutch mechanism, generally designated 87 (FIG. 11), is provided to disengage the sets of coupling gears 46, 47, 48 and 52, 53, 54. The shifting clutch mechanism 87 comprises a flanged rectangular bearing plate 88 which includes two elongated slots 89 and an elongated hole 90, the latter in the center of the plate to clear the coupling gears 46, 47, 48 and 52, 53, 54. A flanged circular support plate 92 also is provided which is fitted between the lower part 20 and the upper part 12 of the housing 11. The support plate 92 is provided with four cam risers 93 which support the bearing plate 88 by means of four notches 94 in a depending flange portion 95 of the bearing plate 88. The cam risers 93 have lower surfaces 93a and upper surfaces 93b. The support plate 92 also is provided with a guide slot 96 and an elongated opening 97, the latter in the center of the support plate to provide clearance for the coupling gears 46, 47, 48 and 52, 53, 54. The clutch mechanism provides for engagement of the coupling gears 46, 47, 48 with coupling gears, respectively, 52, 53, 54 in the indexing position (FIG. 2) when the bearing plate 88 rests on the lower surfaces 93a of the cam risers 93 and provides for disengagement of the coupling gears 46, 47, 48 and 52, 53, 54, in the Playing position (FIG. 3) when the bearing plate 88 rests on the upper surfaces 93b of the cam risers 93.

Shifting is effected through manual operation of a shifting arm 98 which attaches on the flange 95 of the bearing plate 88 by means of slot 100 between two flanges 102 at the inner end of the shifting arm 98. A blocking tab 104 is provided at the outer end of the shifting arm 98 to interlock with and prevent operation of a starting button 106 (FIG. 1) while the clutch mechanism is in engagement (FIG. 2), as described in greater detail hereinafter. Another tab 108 depends from the underside of the shifting arm 98 to operate a tone arm return mechanism, generally designated 109 (FIG. 9).

The bearing plate 88 supports the visual image disc portions 14, 16 and 18 in an "up" or playing position when it rests on the upper surfaces 93b of the cam risers. In this position the tabs 42 on the visual image disc portions 14, 16 and 18 are engaged with the ribs 40 on the underside of the cover 12 such that the visual image disc portions 14, 16 and 18 are locked and cannot be rotated. When the visual image disc portions 14, 16 and 18 are in their up position, the toy device can be operated, since the coupling gears 46, 47, 48 and 52, 53, 54 are disengaged and the recording discs 58, 60 and 62 can rotate while the visual image disc portions 14, 16 and 18 remain stationary. When the bearing plate 88 rests on the lower surfaces 93a of the cam risers 93 the visual image disc portions 14, 16 and 18 are in the "down" or indexing position, and the coupling gears 46, 47, 48 are engaged with coupling gears 52, 53, 54. The visual image disc portions 14, 16 and 18 then are individually manually rotatable about the support shaft 24 and the coupling gears rotate the corresponding recording disc 58, 60 or 62, thus maintaining proper alignment of each visual image disc portion and its corresponding recording disc.

Manual movement of the shifting arm 98 outwardly away from the central support shaft 24 will engage the coupling gears 46, 47, 48 with coupling gears 52, 53, 54. In this indexing position, manual rotation of any one of the visual image discs 14, 16 or 18 will rotate only the corresponding recording disc 58, 60 or 62 respectively, i.e., rotation of visual image disc 16, will rotate recording disc 60 only. The shifting arm 98 can only be shifted toward the central support shaft 24 and thus disengage the coupling gears 46, 47, 48 from coupling gears 52, 53, 54 and the interlock tab 104, only when the tabs 42 on the visual image disc portions 14, 16, 18 are aligned for engagement with the ribs 40 on the upper part 12 of the housing 11. Thus disengagement of the coupling gears 46, 47, 48 and 52, 53, 54 requires the recording discs 58, 60 and 62 to be locked as a unitary member through engagement of the spring 84 with an appropriate notch 82 or detent 80 on the adjacent member.

Figures 5, 8, 9:
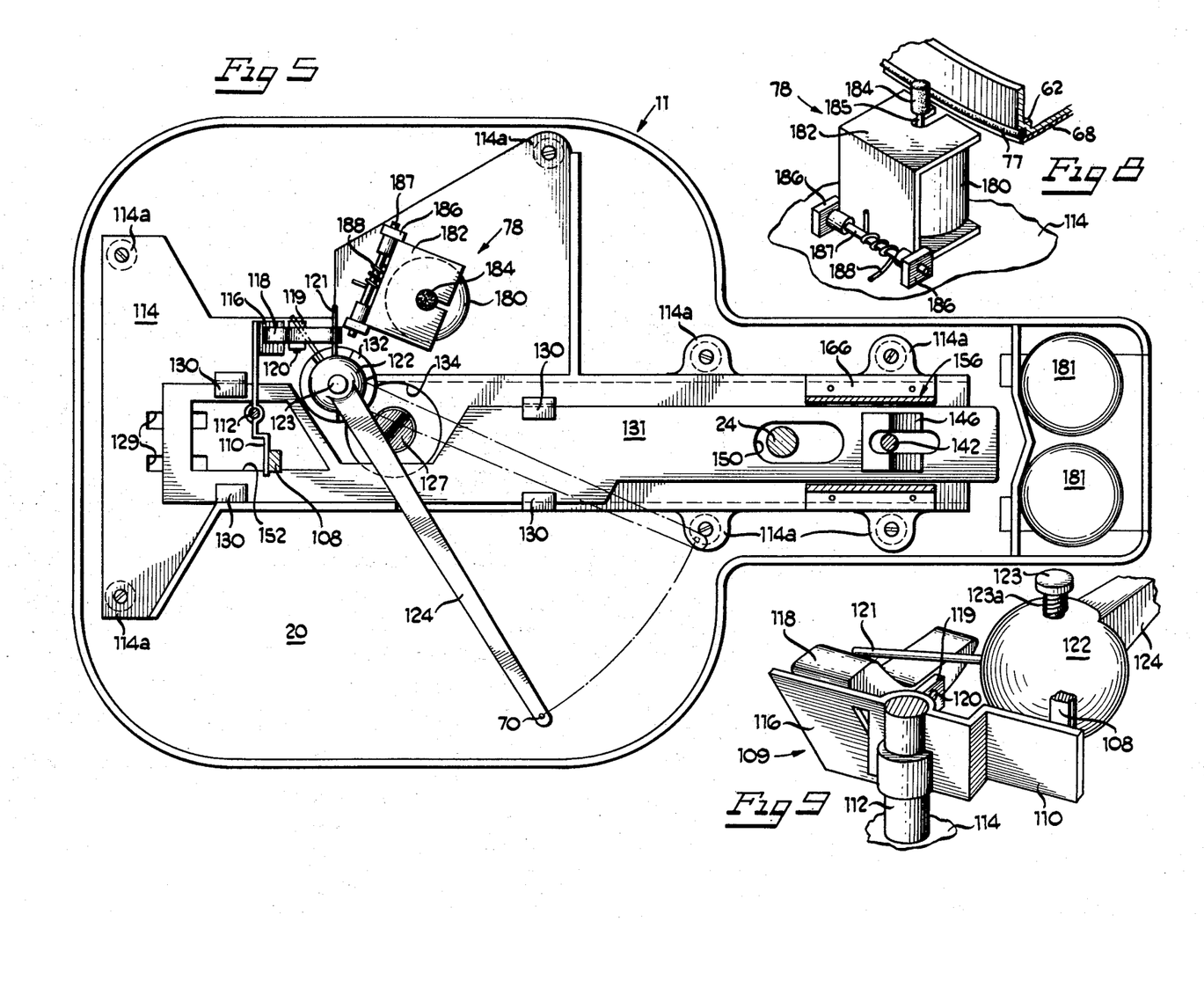
FIG. 5 is a horizontal section taken generally along line 5—5 of FIG. 2 with parts broken away.
FIG. 8 is a broken away perspective view of the drive mechanism.
FIG. 9 is a broken away perspective view of the stylus return mechanism.

FIG. 9 shows a perspective view of the tone arm return mechanism 109 which includes the tab 108 of the shifting arm 98 which activates a lever 110 when the shifting arm 98 is moved to the left in the direction of arrow C shown in FIG. 2. The lever 110, viewed from the top, rotates clockwise on a pin 112 mounted on a support base plate 114 when the clutch mechanism is engaged. The opposite end of the lever 110 has a slanted portion 116 in contact with a bell crank member 118 journalled on the support base plate 114 by two supporting ears 119 and a support pin 120 extending through the ears 119 and the bell crank member 118. The bell crank member 118 rotates upward causing a pin 121 mounted on a spherical tone arm base 122 to rotate clockwise when viewed from the top. This rotation causes a tone arm 124 and the stylus 70 on the inner end thereof to swing back to a starting position, as shown by full lines in FIG. 5, in engagement with the outermost groove of the recording member 68. After the desired indexing of the visual image disc portions 14, 16 and 18, the shifting arm 98 is pushed in toward the right, as shown in the drawings, and the lever 110 returns to its original position under the force applied by the bell crank member 118 as it rotates downward. The stylus 70, which is now in the outermost groove of the recording member 68, will follow the selected combined spiral groove of the recording members 64, 66, 68 as the combination rotates.

The tone arm 124 is constructed integrally with the spherical tone arm base 122 and mounted on the base plate 114. The spherical arm base 122 is provided with an upper pin 123 which is biased by a spring 123a to keep the tone arm base in contact with the base plate and maintain a force on the tone arm 124 to keep the stylus 70 in contact with the recording surfaces. At an intermediate position along the tone arm it is engaged with a picked-up wedge 127 which transmits the vibrations from the sound grooves through the stylus 70 and tone arm 124 to the flexible diaphragm 22 which audibly reproduces the recorded message. The flexibility of the diaphragm, through the pickup wedge 127, applies upward force on the tone arm 124 thus keeping the stylus 70 in contact with the recording surfaces. The component parts of the tone arm mechanism 109 are such that the inertial forces created when the mechanism 109 is activated create a downward force which overcomes the force exerted on the tone arm by the pickup wedge 127 and lifts the stylus 70 from the recording surfaces 64, 66, 68 during retraction from the position of the tone arm shown in phantom in FIG. 5 to the position shown in full lines.

Figure 12:
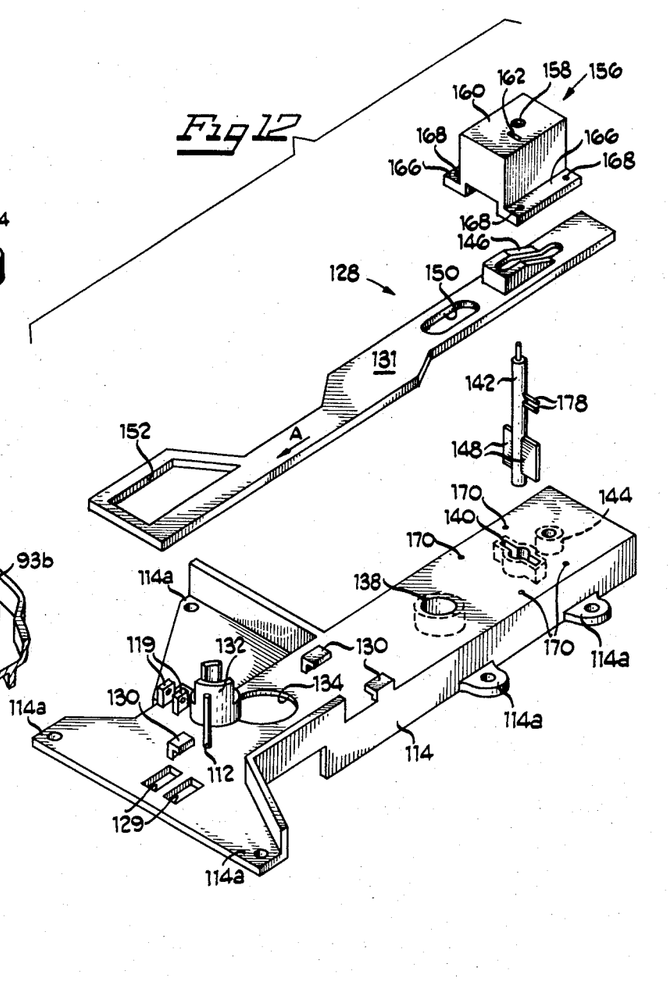
FIG. 12 is an exploded view of the starting mechanism.

A starting assembly, generally designated 128 (FIG. 12), is mounted on the support base plate 114. The base plate is mounted on the bottom interior of the lower housing part 20 by means of screws or bolts through tabs 114a (FIGS. 5 and 12). Two reactangular slots 129 guide the lower portion of the starting button 106 and L-shaped braces 130 guide a slidably mounted switch plate 131. A socket 132 rotatably mounts the spherical tone arm support base 122, and a hole 134 provides for engagement of the pickup wedge 127 on the flexible diaphragm 22. A flanged hole 138 also is provided in the support base plate 114 for a clearance fit with the central support shaft 24. A guide hold 140 is provided for a positive stop pin 142, and a gear support 144. The slidably mounted switch plate 131 is mounted on the base plate 114 including a raised cam surfce 146 for engagement with wings 148 of the positive stop pin 142. An elongated clearance hole 150 and a generally rectangular hole 152 are provided, the latter for engagement with a cam surface 154 on the starting button 106.

Also mounted on the support base 114 is a box-like positive stop pin support, generally designated 156, including a hole 158 in an upper wall portion 160 thereof for supporting the positive stop pin 142, a clearance hole 162 for a movable arm 164 (FIG. 15) of an electrical contact, generally designated 165 and flanges 166 with holes 168 providing means for attachment to complementary holes 170 on the support base plate 114.

Figures 4, 7:
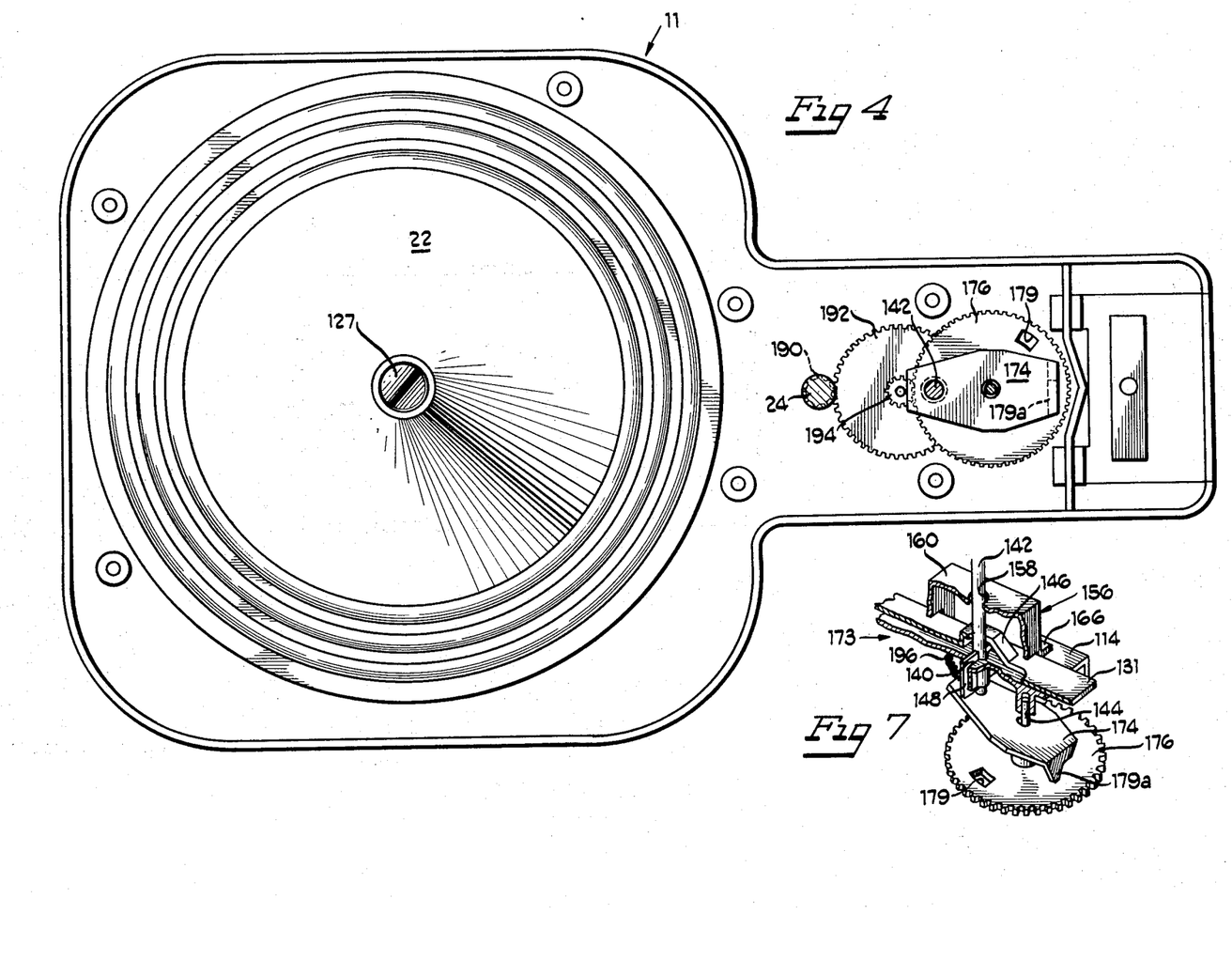
FIG. 4 is a horizontal section taken generally along line 4—4 of FIG. 2.
FIG. 7 is a broken away perspective view of the positive stop mechanism.

A positive stop means, generally designated 173 (FIG. 7), comprises the positive stop pin 142, a positive stop lever 174, and a positive stop gear 176. This means provides for precise positioning of the recording discs 58, 60, 62 relative to the stylus 70. The positive stop pin 142 is provided with two laterally extending pins 178 for engagement with the movable arm 164 of the electrical contact 165. The positive stop gear 176 is provided with a hole 179 for engagement with a tab 179a provided on the positive stop lever 174.

In operation, the starting assembly 128 is activated by depressing the starting button 106 which is slidably mounted in the upper wall 26 of the lower housing part 20. The cam surface 154 (FIGS. 2 and 3) of the starting button 106 abuts against the left hand edge (as viewed in the drawings) of hole 152 in switch plate 131 and slides the switch plate to the left in the direction of arrows A (FIGS. 2 and 12) and thereby causes the positive stop pin 142 (through cam surface 146) to disengage with the central support disc 72 and move downwardly from the position shown in FIG. 2 to the position shown in FIG. 3. By means of the two pins 178, the positive stop pin 142 causes the electrical contact 165 to close and thus start an electric motor 180 (FIG. 15) through batteries 181.

The electric motor 180 is supported on a spring mounted support frame 182 (FIG. 8) such that a cylindrical pulley 184 connected to the motor drive shaft 185 is in constant contact with the flexible ring 77 encircling the outermost recording disc 62. The electric motor 180 and the support frame 182 are pivotally journalled on ears 186 by means of a pin 187. A spring 188 keeps the motor pulley 184 in constant contact with the flexible ring 77. Thus, the recording discs 58, 60 and 62 and the central supporting disc 72 rotate as a unitary member when power is supplied to the electric motor 180, and the pin 74 through the central support disc 72 causes the central support shaft 24 to rotate.

A pinion gear 190 is located on the lower end of the central support shaft 24 and rotates a gear 192 supported on boss 34. A pinion gear 194 rotatable with gear 192 is in mesh with the positive stop gear 176, which is supplied with the hole 179 for engagement with the positive stop lever tab 170a. When the starting button 106 is depressed and cam surface 146 moves to cause the positive stop pin 142 to move downwardly, the positive stop pin 142 causes the positive stop lever 174 (FIG. 2) to rotate in the direction of arrow B thus moving the tab 179a upwardly out of the hole 179 as seen in FIG. 3. The central support shaft 24 then can rotate a fixed number of revolutions to rotate the sound record while the positive stop gear 176 makes only one revolution, due to the gear ratios of gears 190, 192, 194 and 176. At this time it should be pointed out that the tab 104 on the shifting arm 98 serves to interlock the starting mechanism during engagement of the coupling gears. When the shifting arm 98 is moved to the left in the direction of arrow C shown in FIG. 2 the tab 104 blocks the starting button 106 so that it cannot be depressed. Likewise, when the starting button 106 is depressed, it will block the shifting arm 98 so that it cannot be moved to the left, thus preventing engagement of the coupling gears during operation of the device. The positive stop lever 174 is biased by a spring 196 such that when one revolution of the positive stop gear 176 is completed the positive stop lever tab 179a drops back into the hole 179 in the positive stop gear 176, under the biasing of spring 196 causing the positive stop pin 142 to move upward. A cam 198 on the bottom of the central support disc 72 then comes into contact with the movable contact arm 164 and disengages the electrical contact switch 165 thus shutting off the electric motor 180. The momentum of the recording discs 58, 60, 62 rotate the unitary member until the positive stop pin 142 engages back into a hole 200 on the central support disc 72 and provides for an exact positive stop of the recording surfaces 64, 66, 68 so that they always come back into registry with the visual images which have been held in the same position during playing by the ribs 40 and tabs 42.

During rotation of the recording members 64, 66, 68, which commences with the closing of the electrical contact 165, the stylus 70 follows a groove starting at the outermost edge of record member 68 and continues inward across record member 68, then across record member 66, and then across member 64 at which time the cam 198 opens the electrical contact 165 and de-energizes the electric motor 180 whereupon the record members continue to freewheel slightly under momentum until the upper end of pin 142 seats into hole 200.

The toy device 10 is operated by manually sliding the shifting arm 98 outwardly in the direction of arrow C (FIG. 2) to the position shown in FIG. 2. This drops the visual image discs and thus engages the coupling gears 46, 47, 48 with the coupling gears 52, 53, 54 and retracts the tone arm 124. The visual image disc portions 14, 16, 18 then may be manually rotated to form any desired combination of images which automatically rotates the complementary recording discs to create a combined message which is attributable to that particular series of visual images. The shifting arm 98 then is returned to its original position as seen in FIG. 3. The starting button 106 now can be depressed which closes the electrical contact 165, starts the motor to rotate the record discs and disengages the positive stop pin 142 from the central support disc 72. Recorded messages are transmitted from the sound track through the stylus 70 and the tone arm 124 to the flexible diaphragm 22 which produces an audible reproduction of the selected message combination. At the end of the recording, cam 198 opens the electrical contact 165 and the positive stop pin 142 engages with the central support disc 72 for a positive stop of the recording discs 58, 60, 62 assuring proper alignment of the recording discs 58, 60, 62 with the visual image discs for the next message combination selection. This device is shown as designed to contain 10 visual images on each visual image disc portion 14, 16, 18 and ten recorded messages on each recording disc 58, 60, 62, thus providing for 1,000 combinations of visual image and message series. Of course, this number can be decreased or greatly increased.

The foregoing detailed description has been given for clearness of understanding only and no unnecessary limitations should be understood therefrom as some modifications will be obvious to those skilled in the art.

I claim:

1. A multiple message reproducing apparatus with coordinated visual images, comprising:

a housing;

a sound record movably mounted on said housing and having a plurality of relatively movable parts with sound track portions on each part, one of the parts having at least one sound track portion in position for registry with any one of a plurality of the sound track portions on another record part to provide a sound track extending over both record parts, thereby providing for selective changing of the sound track in response to selective adjustment of the record parts to provide selectable multiple audio messages;

a visual image assembly mounted on said housing and having a plurality of relatively movable parts with visual images on each part, the visual images being correlated with the sound track portions on said record parts, one of the parts of the visual image assembly having at least one visual image in position for registry with any one of a plurality of visual images on another part to provide an aligned series of visual images extending over both parts, thereby providing for selective changing of the visual image series in response to selective adjustment of the parts; and means for coupling said sound record parts and said parts of said visual image assembly for conjoint adjustment so that said visual images when in a selected registrable series are correlated to the particular audio message provided by the sound track of said sound record.

2. The apparatus of claim 1 including a plurality of spaced apart sound track portions on each record part, each sound track portion being in position for registry with any one of a plurality of the sound track portions of the other record part to provide a plurality of selectively changeable sound tracks extending over both record parts.

3. The apparatus of claim 2 wherein said sound record is generally of the disc type having a generally flat playing area on which said sound track is disposed, the playing area being revolvable about an axis generally perpendicular thereto, and said record parts being relatively movable for adjustment about an axis generally coincident to said revolving axis of the record.

4. The apparatus of claim 3 wherein said relatively movable record parts comprise generally annular portions of the record forming relatively movable annular portions of said playing area generally concentric to said axes.

5. The apparatus of claim 4 wherein said visual image assembly comprises a plurality of discs rotatably mounted on said housing generally concentric to said axes, said discs being rotatable relative to each other and having a plurality of visual images arranged annularly thereabout for selective registry in a generally radial series.

6. The apparatus of claim 5 wherein said visual image assembly generally overlies said sound record.

7. The apparatus of claim 6 including sound reproducing means on said housing and engageable with said sound record for reproducing audible messages from said sound track, and means for disengaging said coupling means when said sound reproducing means is in operative association with said sound track.

8. The apparatus of claim 7 including means for automatically disengaging said coupling means in response to operatively associating said sound reproducing means with said sound record.

9. The apparatus of claim 8 including means for preventing operation of said sound reproducing means unless said coupling means is disengaged.

10. The apparatus of claim 7 wherein said disengaging means lifts said visual image assembly out of coupling engagement with said sound record.

11. The apparatus of claim 1 including sound reproducing means on said housing and engageable with said sound record for reproducing audible messages from said sound track, and means for disengaging said coupling means when said sound reproducing means is in operative association with said sound track so as to maintain said visual assembly stationary when said sound record is rotated.

12. The apparatus of claim 11 including means for automatically disengaging said coupling means in response to operatively associating said sound reproducing means with said sound record.

13. The apparatus of claim 12 including means for preventing operation of said sound reproducing means unless said coupling means is disengaged.

14. The apparatus of claim 11 including means to return said sound record back to its original position for coupling with said visual image assembly at the termination of a reproduction of a sound track so that the visual image portions on said assembly remain in coordinated position for recoupling of said assembly to said record.

15. The apparatus of claim 1 wherein said sound record is generally of the disc type having a generally flat playing area on which said sound track is disposed, the playing area being revolvable about an axis generally perpendicular thereto, and said record parts being relatively movable for adjustment about an axis generally coincident to said revolving axis of the record.

16. The apparatus of claim 15 wherein said relatively movable record parts comprise generally annular portions of the record forming relatively movable annular portions of said playing area generally concentric to said axes.

17. The apparatus of claim 16 wherein said relatively movable annular portions of said playing area are of generally uniform width and extend 360° about said axes, with the outer circular periphery of an inner record part being adjacent the inner circular periphery of an immediately adjacent outer record part to form a joint to permit a stylus or other appropriate sound pickup unit to pass from one record part to another.

18. The apparatus of claim 17 wherein said visual image assembly comprises a plurality of discs rotatably mounted on said housing generally concentric to said axes, said discs being rotatable relative to each other and having a plurality of visual images arranged annularly thereabout for selective registry in a generally radial series.

* * * * *